United States Patent
Weaver et al.

(10) Patent No.: US 8,042,618 B2
(45) Date of Patent: Oct. 25, 2011

(54) METHODS FOR SWELLING SWELLABLE ELEMENTS IN A PORTION OF A WELL USING AN OIL-IN-WATER EMULSION

(75) Inventors: Jimmie D. Weaver, Duncan, OK (US); Richard D. Rickman, Duncan, OK (US); David B. Allison, Duncan, OK (US); Michael A. McCabe, Duncan, OK (US); Matt E. Blauch, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 234 days.

(21) Appl. No.: 12/539,512

(22) Filed: Aug. 11, 2009

(65) Prior Publication Data

US 2011/0036572 A1 Feb. 17, 2011

(51) Int. Cl.
*E21B 33/12* (2006.01)
*E21B 33/134* (2006.01)

(52) U.S. Cl. ......... 166/387; 166/179; 507/925; 507/926

(58) Field of Classification Search .......... None
See application file for complete search history.

(56) References Cited

U.S. PATENT DOCUMENTS

| | | | | |
|---|---|---|---|---|
| 3,385,367 | A * | 5/1968 | Kollsman | 166/191 |
| 4,936,386 | A * | 6/1990 | Colangelo | 166/292 |
| 6,907,937 | B2 * | 6/2005 | Whanger et al. | 166/387 |
| 7,493,947 | B2 * | 2/2009 | Ross | 166/228 |
| 7,665,537 | B2 * | 2/2010 | Patel et al. | 166/387 |
| 7,703,520 | B2 * | 4/2010 | Dusterhoft | 166/278 |
| 7,841,398 | B2 * | 11/2010 | Tibbles et al. | 166/227 |
| 2009/0131563 | A1 * | 5/2009 | Wang et al. | 524/96 |
| 2009/0133875 | A1 * | 5/2009 | Tibbles et al. | 166/278 |
| 2009/0173497 | A1 * | 7/2009 | Dusterhoft | 166/276 |
| 2010/0147507 | A1 * | 6/2010 | Korte et al. | 166/118 |
| 2010/0243242 | A1 * | 9/2010 | Boney et al. | 166/250.01 |

* cited by examiner

*Primary Examiner* — George Suchfield
(74) *Attorney, Agent, or Firm* — Robert A. Kent; Booth Albanesi Schroeder LLC

(57) ABSTRACT

A method is provided for swelling water-swellable elements located in a portion of a well. The method comprises the steps of: (A) introducing an oil-in-water emulsion into the portion of the well, wherein the oil-in-water emulsion comprises: (i) an aqueous liquid, wherein the aqueous liquid is the external phase of the oil-in-water emulsion; (ii) a hydrocarbon liquid, wherein the hydrocarbon liquid is an internal phase of the oil-in-water emulsion, and wherein the hydrocarbon liquid is adjacent to the external phase of the oil-in-water emulsion; and (iii) a surfactant; and (B) allowing the oil-in-water emulsion to contact the water-swellable element for a sufficient length of time to cause the thickness of the water-swellable element to expand by a desired percentage, wherein the desired percentage is at least 5%.

20 Claims, No Drawings

METHODS FOR SWELLING SWELLABLE ELEMENTS IN A PORTION OF A WELL USING AN OIL-IN-WATER EMULSION

SUMMARY

The field of the invention is directed to methods of swelling swellable elements located in an oil or gas well.

According to an aspect of the invention, a method for swelling a water-swellable element located in a portion of a well is provided. The method comprises the steps of: (A) introducing an oil-in-water emulsion into the portion of the well, wherein the oil-in-water emulsion comprises: (i) an aqueous liquid, wherein the aqueous liquid is the external phase of the oil-in-water emulsion; (ii) a hydrocarbon liquid, wherein the hydrocarbon liquid is an internal phase of the oil-in-water emulsion, and wherein the hydrocarbon liquid is adjacent to the external phase of the oil-in-water emulsion; and (iii) a surfactant; and (B) allowing the oil-in-water emulsion to contact the water-swellable element for a sufficient length of time to cause the thickness of the water-swellable element to expand by a desired percentage, wherein the desired percentage is at least 5%.

As used herein, the words "comprise," "have," "include," and all grammatical variations thereof are each intended to have an open, non-limiting meaning that does not exclude additional elements or steps.

DETAILED DESCRIPTION OF THE INVENTION

Oil and gas hydrocarbons are naturally occurring in some subterranean formations. A subterranean formation containing oil or gas is sometimes referred to as a reservoir. A reservoir may be located under land or off shore. Reservoirs are typically located in the range of a few hundred feet (shallow reservoirs) to a few tens of thousands of feet (ultra-deep reservoirs). In order to produce oil or gas, a well is drilled into a subterranean formation.

As used herein, a "well" includes at least one wellbore drilled into a subterranean formation, which may be a reservoir or adjacent to a reservoir. A wellbore can have vertical and horizontal portions, and it can be straight, curved, or branched. As used herein, the term "wellbore" refers to a wellbore itself, including any uncased, open-hole portion of the wellbore. A near-wellbore region is the subterranean material and rock of the subterranean formation surrounding the wellbore. The near-wellbore region is normally considered the region within about 100 feet of the wellbore. As used herein, a "well" also includes the near-wellbore region. As used herein, "into a well" means and includes into any portion of the well, including into the wellbore or into the near-wellbore region via the wellbore.

A wellbore may be an open hole or cased hole. In an open-hole wellbore, a tubing string is placed into the wellbore. The tubing string allows fluids to be placed into or removed from the wellbore. In a cased hole, a casing is placed into the wellbore, and a tubing string can be placed in the casing. An annulus is the space between two concentric objects, such as between the wellbore and casing, or between casing and tubing, where fluid can flow.

The wellbore can be gauged or non-gauged. A gauged wellbore means a wellbore that is essentially the same diameter as the drill bit that was used to drill it. For example, if a drill bit of 8¼ inches is used, then the resulting wellbore diameter is essentially 8¼ inches. Conversely, a non-gauged wellbore means a wellbore that has a larger diameter than the drill bit that was used to drill it. A wellbore can become non-gauged by some of the formation sloughing off or washing out after drilling because the formation is soft. Another way a wellbore can become non-gauged is by some action taking place during the drilling process which causes the diameter to become larger after drilling has stopped.

During well completion, it is commonly desired to seal a portion of an annulus so fluids will not flow through the annulus but rather flow through the tubing string or casing. By sealing the portion of the annulus, oil or gas can be produced in a controlled manner through the wellhead via the tubing string or casing. Different tools can be used to create seals in the well. Examples of such tools include packers and bridge plugs.

Hydraulic or swellable packers can be utilized to seal the annulus in a gauged wellbore. A hydraulic packer is hydraulically actuated and carries a packer element. The packer element is a ring fitted on the outside of a mandrel attached to a tubing string or casing. Hydraulic actuation of the packer axially squeezes the packer element to cause radial expansion of the packer element and seals the annulus. However, hydraulic packers are not feasible for use in non-gauged wellbores due to the limited expansion of the packer element.

A swellable packer can be used in gauged or non-gauged wellbores. A swellable packer includes a swellable element, which can swell to a size that is larger than the size of the pre-swelled element. The swellable element is a ring fitted around the outside of a portion of a tubing string or casing or a mandrel attached to either. The swellable element normally is axially constrained on the top and bottom such that the swellable element can expand in a radial direction only. As the swellable element swells, it expands radially and seals the annulus.

Typical swellable packers can range from 1 foot to 30 feet in length. A typical swellable element for a swellable packer can range from 1 foot to 30 feet in length. The inner diameter of a swellable element for a packer can be selected such that the swellable element fits around the outer diameter of the tubing string, casing, or mandrel. The typical inner diameter of a swellable element can range from 1 inch to 16 inches. The thickness of a swellable element is the difference between the largest outer diameter and the inner diameter of the swellable element, measured at the axial location of the largest outer diameter. Preferably, the swellable element can swell at least sufficiently such that the swellable element can create a seal in the annulus. Preferably, the thickness of the swellable element can swell at least 5%. In order to function as a sealing element, however, the swellable element must be capable of maintaining a desired pressure barrier, e.g., a pressure barrier of 500 psi. In order to maintain the desired pressure barrier, the thickness of the swellable element preferably expands by a percentage equal to or less than 115%. The percentage of expansion is meant to take into account the fact that the swellable element is constrained to expand in a radial direction only. The outer diameter of the swellable element typically ranges from 1.5 inches to 17.5 inches.

A bridge plug is a tool that can be located and set in a wellbore in order to isolate a lower part of the wellbore from an upper part of the wellbore. Like a packer, a bridge plug can be hydraulic or it can be swellable. A swellable bridge plug can be used to isolate portions of a gauged, non-gauged, or cased wellbore, and it operates in a manner similar to a swellable packer. A bridge plug typically ranges from 2.35 inches to 12.15 inches in outer diameter and 3 feet to 16 feet in length. A typical swellable element for a bridge plug can range from 2.4 inches to 17.5 inches in outer diameter and 1 foot to 14 feet in length.

According to a method of use, a swellable packer or bridge plug is placed in a portion of a wellbore. Of course, more than one swellable packer or bridge plug can be placed in the wellbore. A combination of swellable packers and bridge plugs also can be placed in portions of a wellbore. A swelling fluid is then introduced directly into the annulus itself, or introduced into the annulus via the tubing string or casing. The swelling fluid is allowed to contact the swellable element of the packer or bridge plug, which causes the swellable element to begin swelling. The swelling fluid is allowed to remain in contact with the swellable element for a sufficient time for the swellable element to swell and expand to a sufficient size to seal the annulus.

Some swellable elements swell in the presence of an aqueous liquid (water-swellable elements). As used herein, a "swellable element" means an element that is capable of expanding at least 5% in volume. Examples of suitable materials for use as a water-swellable element include, but are not limited to, elastomers such as nitrile, HNBR, fluoroelastomers, or acrylate-based elastomers, or their precursors, if added in variable amounts to an EPDM polymer or its precursor monomer mixture, along with a sufficient amount (from about 1 to 10 per hundred rubber "phr") of an unsaturated organic acid, anhydride, or salt thereof, such as maleic acid, optionally combined with a sufficient amount (from about 1 to 10 phr) of an inorganic swelling agent such as sodium carbonate, may produce a water-swellable elastomer having variable low-oil swellability. Adding a sufficient amount (from about 0.5 to 5 phr) of a highly acidic unsaturated compound such as 2-acrylamido-2-methylpropane sulfonic acid (AMPS) to the monomer mixture, or to the elastomer after polymerization, results in a water-swellable elastomer having variable oil-swellability, and which is further swellable in low pH fluids such as completion fluids containing zinc bromide. A second addition of an additional amount (from 1 to 10 phr) of inorganic swelling agent enhances swellability in low pH, high concentration brines. Finally, the addition of a sufficient amount (from 1 to 20 phr) of a zwitterionic polymer or copolymer of a zwitterionic monomer with an unsaturated monomer, results in a cross-linked elastomer. The amounts of the various ingredients at each stage may be varied as suited for the particular purpose at hand. For example, if one simply wishes to produce a highly cross-linked, moderately water-swellable (about 100 percent swell) elastomer having very low oil-swellability, but very high swellability in low pH fluids, one would use a recipe of 60 to 80 phr of EPDM, and 20 to 40 phr of nitrile or HNBR, and 4 to 5 phr of AMPS, as well as about 15 to 20 phr of a zwitterionic polymer or monomer. Each material will have an expansion coefficient, which is the maximum possible amount of expansion for that material. For example, Styrene Butadiene has an expansion coefficient of 1.5, which means Styrene Butadiene is capable of expanding 1.5 times in volume after swelling.

However, depending on the type of subterranean formation, if some prior-art swelling fluids contact the formation for the period of time sufficient to swell the swellable element, then the formation can be affected adversely. One way a formation can be affected adversely is the permeability of the formation may be decreased. The permeability of a subterranean formation refers to how easily a fluid will flow through the formation. For example, if the permeability is high, then fluids will flow more easily and more quickly through the formation. If the permeability is low, then fluids will flow less easily and more slowly through the formation. As used herein, a "high permeability" formation means the formation has a permeability of at least 100 millidarcy (mD).

As used herein, a "low permeability" formation means the formation has a permeability of less than 100 millidarcy (mD).

One example of a formation that can be affected adversely by prior-art swelling fluids is a water-sensitive formation. A prior-art swelling fluid for water-swellable elements is water. In a water-sensitive formation, if water is used, then significant damage to the formation can occur. Thus, there is a need to develop a swelling fluid for water-swellable elements that will not be as damaging to water-sensitive formations.

It has been discovered that an oil-in-water emulsion can be used for sensitive formations such as, but not limited to, water-sensitive formations without being as detrimental to the formation compared to prior-art swelling fluids. The emulsion according to the invention also can be used in formations that are not sensitive formations.

As used herein, an "emulsion" is a mixture of two or more immiscible (unblendable) liquids. One of the liquids is dispersed in the other liquid and makes up the dispersed or internal phase of the emulsion. The other liquid makes up the continuous or external phase of the emulsion. Of course, there can be more than one internal phase of the emulsion, but only one external phase. For example, there can be an external phase which is adjacent to a first internal phase, and the first internal phase can be adjacent to a second internal phase. As used herein, an "oil-in-water emulsion" is an emulsion in which a hydrocarbon liquid is the internal phase, and an aqueous liquid is the external phase. As used herein, a "water-in-oil emulsion" is an emulsion in which an aqueous liquid is the internal phase, and a hydrocarbon liquid is the external phase. An oil-in-water emulsion can be used to swell water-swellable packers.

As used herein, a "hydrocarbon liquid" means a homogenous liquid comprising hydrocarbon. As used herein, an "aqueous liquid" means a homogenous liquid comprising water. As used herein, a "surfactant" means an organic compound that is amphiphilic and is soluble in both organic solvents and water.

The emulsion according to the invention includes a hydrocarbon liquid. The hydrocarbon liquid can be a refined hydrocarbon liquid or a terpene. Crude oil can be refined into fractions using a process called distillation. Distilling crude oil is the process of separating the fractions based on their differences in boiling points. Examples of refined hydrocarbon liquids include, but are not limited to, diesel, gasoline, xylene, octane, and hexane. A terpene is a hydrocarbon produced primarily by a wide variety of plants, in particular conifers. An example of a suitable terpene for use as a hydrocarbon liquid includes, but is not limited to, pinene, limonene, and Paragon I™ (commercially available from Halliburton Energy Services, Inc. in Duncan, Okla.).

The emulsion according to the invention includes a surfactant. The surfactant is used to help lower the interfacial tension between two adjacent liquids making up the emulsion. This allows the liquid making up the internal phase to form discrete droplets which are generally uniformly distributed in the liquid making up the external phase. A surfactant molecule is amphiphilic. It comprises a hydrophobic tail group and a hydrophilic head group. The hydrophilic head can be charged. A cationic surfactant includes a positively-charged head. An anionic surfactant includes a negatively-charged head. A zwitterionic surfactant includes both a positively- and negatively-charged head. A surfactant that has a neutral charge is called a non-ionic surfactant.

If a surfactant is in a sufficient concentration in a solution, then the surfactant molecules can form micelles. A "micelle" is an aggregate of surfactant molecules dispersed in a solution. A micelle in a hydrocarbon solution forms with the hydrophobic tails in contact with the hydrocarbon solution, sequestering the hydrophilic heads in the center of the micelle. Conversely, a micelle in an aqueous solution forms with the hydrophilic heads in contact with the surrounding aqueous solution, sequestering the hydrophobic tails in the micelle center. The surfactant must be in a sufficient concentration to form a micelle, known as the critical micelle concentration. The critical micelle concentration is the concentration of surfactant above which micelles are spontaneously formed.

The hydrophilic-lipophilic balance ("HLB") or the surfactant packing parameter ("SPP") of the surfactant can be used to determine whether an emulsion forms as an oil-in-water or water-in-oil emulsion. HLB is a measure of the degree to which a surfactant is hydrophilic or lipophilic. One formula that can be used to calculate HLB is as follows:

$$HLB=20*Mh/M$$

where Mh is the molecular mass of the hydrophilic portion of the surfactant; and M is the molecular mass of the surfactant as a whole. A surfactant with an HLB greater than 10 forms an oil-in-water emulsion. A surfactant with an HLB equal to 10 can form either an oil-in-water or water-in-oil emulsion depending on the concentration of both the aqueous liquid and the hydrocarbon liquid.

The surfactant packing parameter (SPP) can also be used to determine whether the emulsion forms an oil-in-water or water-in-oil emulsion. The SPP can be calculated as follows:

$$SPP=v/(l*a_o)$$

where v is the volume of the hydrocarbon core of the surfactant; l is the hydrocarbon chain length; and $a_o$ is the area of the head group. The head group is conical in shape and, as such, the area of the head group can be calculated as follows:

$$a_o=\pi r(r+\sqrt{(r^2+h^2)})$$

where r is the radius of the circular base, and h is the height. A surfactant with an SPP less than 1 forms an oil-in-water emulsion. A surfactant with an SPP equal to 1 can form either an oil-in-water or water-in-oil emulsion depending on the concentration of both the aqueous liquid and the hydrocarbon liquid.

The emulsion can contain other components, including, for example, salt, fine particulate matter like silica dust, weighting materials like barite or silica, and other surfactants.

One advantage to using the emulsion according to the invention is the emulsion utilize approximately 25% to 65% less water as the external phase compared to prior-art swelling fluids. For example, an oil-in-water emulsion according to the invention only uses approximately 35% to 75% of water as the external phase; whereas, a prior-art swelling fluid uses approximately 100% of water.

Another advantage to using the emulsion according to the invention is it can have a higher viscosity compared to prior-art swelling fluids. Viscous materials resist shear flow and strain linearly with time when a stress is applied to the material. Viscosity can be expressed in units of centipoise (cP). As used herein, "low viscosity" is a fluid with a viscosity of less than 3 cP at a temperature of 76° F. and a pressure of 1 atmosphere. As used herein, "high viscosity" is a fluid with a viscosity of at least 3 cP at a temperature of 76° F. and a pressure of 1 atmosphere. This higher viscosity of the emulsion is particularly advantageous in high permeability formations, such as formations that are naturally fractured. For example, shale formations naturally contain fractures, which are cracks or cervices that allow fluids to flow more rapidly towards or away from the wellbore. A prior-art swelling fluid due to its lower viscosity, once introduced into a formation, will tend to "leak-off" and flow into the formation via the fractures. As a result of this leak-off, the prior-art swelling fluid does not maintain contact with the swellable element for the length of time sufficient to cause the amount of swelling needed. However, because the emulsion according to the invention can be adapted to be more viscous, the emulsion does not leak-off as much as the prior-art swelling fluid, and, therefore, the emulsion can be adapted to maintain contact with the swellable element for the length of time sufficient to cause swelling.

Preferred Embodiment of the Emulsion

According to an aspect of the invention, a method for swelling a water-swellable element located in a portion of a well is provided. The method comprises the steps of: (A) introducing an oil-in-water emulsion into the portion of the well, wherein the oil-in-water emulsion comprises: (i) an aqueous liquid, wherein the aqueous liquid is the external phase of the oil-in-water emulsion; (ii) a hydrocarbon liquid, wherein the hydrocarbon liquid is an internal phase of the oil-in-water emulsion and wherein the hydrocarbon liquid is adjacent to the external phase of the oil-in-water emulsion; and (iii) a surfactant; and (B) allowing the oil-in-water emulsion to contact the water-swellable element for a sufficient length of time to cause the thickness of the water-swellable element to expand by a desired percentage, wherein the desired percentage is at least 5%. The method preferably includes a step of determining or selecting the desired percentage for a particular application.

The water-swellable element can be part of a swellable packer, bridge plug, and other downhole mechanical devises.

Preferably, the aqueous liquid is in a concentration of at least 20% by volume of the hydrocarbon liquid. More preferably, the aqueous liquid is in a concentration in the range of 35% to 75% by volume of the hydrocarbon liquid. Most preferably, the aqueous liquid is in a concentration in the range of 50% to 70% by volume.

The surfactant can have a hydrophilic-lipophilic balance (HLB) equal to 10. If the HLB equals 10, then, in order to form an oil-in-water emulsion, the aqueous liquid is preferably in a concentration of 50% by volume of the hydrocarbon liquid. Preferably, the surfactant has an HLB of greater than 10. More preferably, the surfactant has an HLB of greater than 15.

The surfactant can have a surfactant packing parameter (SSP) equal to 1. If the SSP equals 1, then, in order to form an oil-in-water emulsion, the aqueous liquid is preferably in a concentration of 50% by volume of the hydrocarbon liquid. Preferably, the surfactant has an SPP of less than 1. More preferably, the surfactant has an SPP of less than 0.5.

Preferably, the surfactant is in a concentration of at least 0.5% by volume of the aqueous liquid. More preferably, the surfactant is in a concentration in the range of 0.5% to 10% by volume of the aqueous liquid. Most preferably, the surfactant is in a concentration in the range of 1% to 5% by volume of the aqueous liquid.

The hydrocarbon liquid for the oil-in-water emulsion can be selected from the group consisting of a refined hydrocarbon liquid, a terpene, and any combination thereof in any proportion. Preferably, the hydrocarbon liquid for the emulsion is a terpene. Suitable examples of a refined hydrocarbon liquid include diesel, gasoline, xylene, octane, and hexane in any combination thereof in any proportion. A suitable example of a terpene is pinene, limonene, and Paragon I™ (commercially available from Halliburton Energy Services, Inc. in Duncan, Okla.).

The oil-in-water emulsion includes an aqueous liquid. The aqueous liquid can include water, wherein the water can be selected from the group consisting of fresh water, brackish water, salt water, and brine. The emulsion can include salt. Preferably the salt is selected from sodium chloride, potassium chloride, calcium chloride, sodium bromide, potassium bromide, and any combination thereof in any proportion. Preferably, the salt is in a concentration of at least 0.5 pounds per gallon of the water. More preferably, the salt is in a concentration in the range of 0.5 to 13 pounds per gallon of the water.

The oil-in-water emulsion includes a surfactant. The surfactant for the emulsion can be non-ionic, anionic, cationic, or zwitterionic. The surfactant for the emulsion can include, but is not limited to, ethoxylated octadecylamines (>~5 EO's), ethoxylated cocoalkylamines (>~2 EO's), ethoxylated tallowalkylamines (>~3 EO's), and any combination thereof in any proportion. Suitable commercially available surfactants include, but are not limited to, Ethomeen T-12™, Ethomeen C-25™, Ethomeen T-15™, and any combination thereof in any proportion.

The oil-in-water emulsion can include additional components. For example, the emulsion can include salt, fine particulate matter like silica dust, weighting materials like barite or silica, and other surfactants.

Methods of Swelling a Swellable Element in a Wellbore

The method steps according to the invention include the step of introducing the emulsion into the portion of the well. Preferably, the portion of the well is a portion of the annulus. Preferably, the step of introducing is performed in a manner such that the emulsion comes into contact with the swellable element. For example, the emulsion can be pumped directly into the portion of the annulus or it can be pumped into the portion of the annulus via a tubing string, coiled tubing, or casing.

The method steps can further include the step of positioning the swellable element into the portion of the well prior to the step of introducing. Preferably, the portion of the well is a portion of the annulus or a portion of a casing. More than one swellable element can be positioned into the portion of the well.

The method steps include allowing the emulsion to contact the swellable element for a sufficient length of time to cause the thickness of the water-swellable element to expand by a desired percentage. Preferably, the sufficient length of time is at least 1 day. More preferably, the sufficient length of time is in the range of 3 days to 30 days. Most preferably, the sufficient length of time is in the range of 3 days to 10 days.

The thickness of the swellable element expands by a desired percentage, wherein the desired percentage is at least 5%. As used herein, the "thickness" of the swellable element means the difference between the largest outer diameter of the swellable element and the inner diameter of the swellable element, measured at the axial location of the largest outer diameter. For a swellable element that is part of a swellable packer, the inner diameter will be positioned closest to the tubing string, casing, or mandrel. For example, if the casing has an outer diameter of 7 inches, then the inner diameter of the swellable element will be approximately 7 inches. If the swellable element has a largest outer diameter of 8.5 inches and an inner diameter of 7 inches at the axial location of the largest outer diameter, then the thickness will be 1.5 inches. For a swellable element that is part of a bridge plug, the inner diameter will be positioned closest to the outer diameter of the bridge plug. The desired percentage can be multiplied by the thickness of the swellable element to obtain a final thickness of the swellable element. For example, in the above illustration, if the thickness is 1.5 inches and the desired percentage is 100%, then the final thickness of the swellable element would be approximately 3.0 inches. Preferably, the desired percentage is sufficient such that the swellable element creates a seal in the portion of the well. Preferably, the desired percentage is equal to or less than 115%. More preferably, the desired percentage is in the range of 5% to 100%. Most preferably, the desired percentage is in the range of 5% to 60%.

The method steps can further include the step of producing oil or gas from the well after the step of allowing. For example, the step of producing can include producing the oil or gas via a production well.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified, and all such variations are considered within the scope and spirit of the present invention. While compositions and methods are described in terms of "comprising," "containing," or "including" various components or steps, the compositions and methods can also "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method for swelling a water-swellable element located in a portion of a well, the method comprising the steps of:
    (A) introducing an oil-in-water emulsion into the portion of the well, wherein the oil-in-water emulsion comprises:
        (i) an aqueous liquid, wherein the aqueous liquid is the external phase of the oil-in-water emulsion;
        (ii) a hydrocarbon liquid, wherein the hydrocarbon liquid is an internal phase of the oil-in-water emulsion and wherein the hydrocarbon liquid is adjacent to the external phase of the oil-in-water emulsion; and
        (iii) a surfactant; and
    (B) allowing the oil-in-water emulsion to contact the water-swellable element for a sufficient length of time to cause the thickness of the water-swellable element to expand by a desired percentage, wherein the desired percentage is at least 5%.

2. The method according to claim 1, wherein the portion of the well is a portion of an annulus.

3. The method according to claim 1, wherein the aqueous liquid comprises water, and the water is selected from the group consisting of fresh water, brackish water, salt water, and brine.

4. The method according to claim 1, wherein the hydrocarbon liquid is selected from the group consisting of a refined hydrocarbon liquid, a terpene, and any combination thereof in any proportion.

5. The method according to claim 4, wherein the refined hydrocarbon liquid is selected from the group consisting of diesel, gasoline, xylene, octane, and hexane in any combination thereof in any proportion.

6. The method according to claim 4, wherein the terpene is selected from the group consisting of pinene, limonene, and any combination thereof in any proportion.

7. The method according to claim 1, wherein the aqueous liquid is in a concentration of at least 20% by volume of the hydrocarbon liquid.

8. The method according to claim 1, wherein the aqueous liquid is in a concentration in the range of 35% to 75% by volume of the hydrocarbon liquid.

9. The method according to claim 1, wherein the aqueous liquid is in a concentration in the range of 50% to 70% by volume of the hydrocarbon liquid.

10. The method according to claim 1, wherein the surfactant has an HLB of greater than 10.

11. The method according to claim 1, wherein the surfactant has an SPP of less than 1.

12. The method according to claim 1, wherein the surfactant is selected from the group consisting of ethoxylated octadecylamines, ethoxylated cocoalkylamines, ethoxylated tallowalkylamines, and any combination thereof in any proportion.

13. The method according to claim 1, wherein the surfactant is in a concentration of at least 0.5% by volume of the aqueous liquid.

14. The method according to claim 1, wherein the surfactant is in a concentration in the range of 0.5% to 10% by volume of the aqueous liquid.

15. The method according to claim 1, wherein the surfactant is in a concentration in the range of 1% to 5% by volume of the aqueous liquid.

16. The method according to claim 1, further comprising the step of positioning the water-swellable element into the portion of the well prior to the step of introducing.

17. The method according to claim 1, wherein the sufficient length of time is at least 1 day.

18. The method according to claim 1, wherein the sufficient length of time is in the range of 3 days to 30 days.

19. The method according to claim 1, wherein the desired percentage is equal to or less than 115%.

20. The method according to claim 1, wherein the desired percentage is in the range of 5% to 60%.

* * * * *